United States Patent [19]

Van Norman

[11] 4,107,738
[45] Aug. 15, 1978

[54] SEWER INSPECTION DEVICE AND METHOD OF SCANNING SEWERS FOR LEAKS

[75] Inventor: John W. Van Norman, Kansas City, Kans.

[73] Assignee: Conco Inc., Mendota, Ill.

[21] Appl. No.: 717,544

[22] Filed: Aug. 25, 1976

[51] Int. Cl.² .............................................. H04N 7/18
[52] U.S. Cl. .................................................... 358/100
[58] Field of Search .................... 358/93, 100, 106, 99

[56] References Cited

U.S. PATENT DOCUMENTS

| 2,963,543 | 12/1960 | Link et al. | 358/99 |
| 3,739,089 | 6/1973 | Latall | 358/100 |
| 3,885,091 | 5/1975 | Fish et al. | 358/100 |

Primary Examiner—Richard Murray
Attorney, Agent, or Firm—Wegner, Stellman, McCord, Wiles & Wood

[57] ABSTRACT

A camera, as for example a TV camera, is associated with a hydraulic jet nozzle unit whereby delivery of water under pressure to the jet nozzle unit causes rearwardly-directed jets of water to advance the camera and jet unit along a sewer, with the structure being retracted along the sewer by suitable means, such as rewinding a hose which supplies water under pressure to the jet nozzle unit.

3 Claims, 3 Drawing Figures

U.S. Patent   Aug. 15, 1978   4,107,738
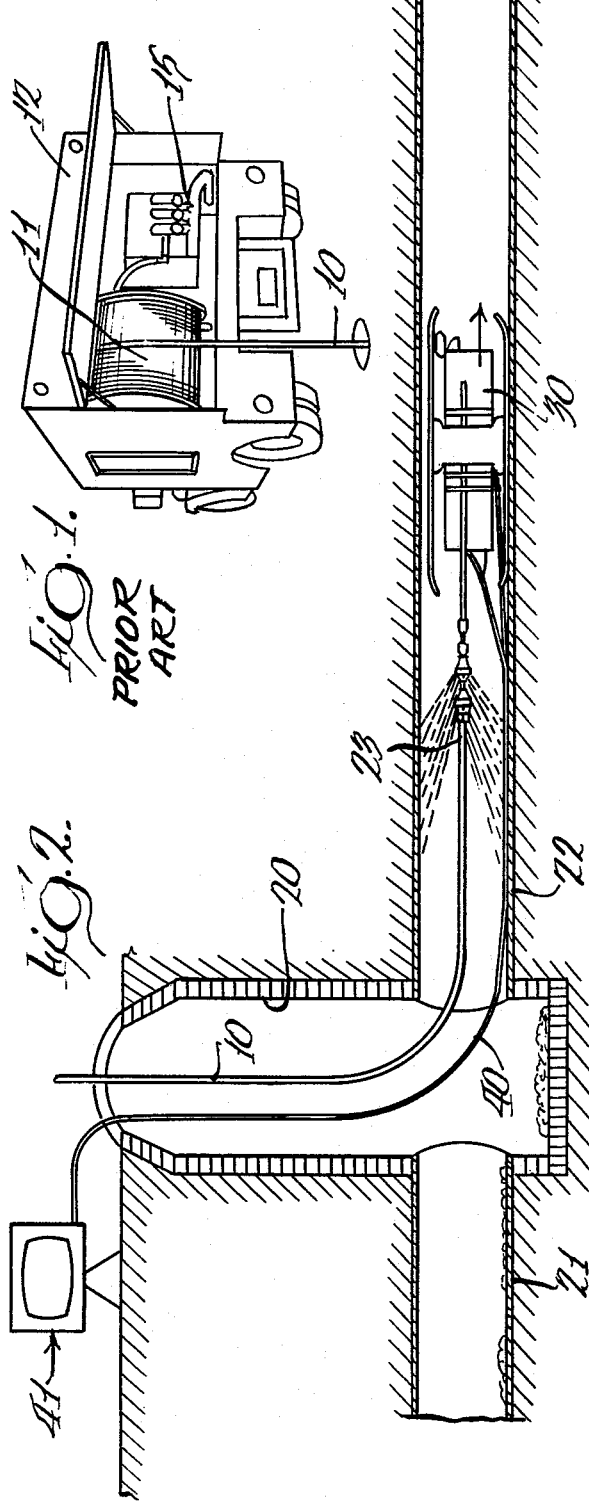
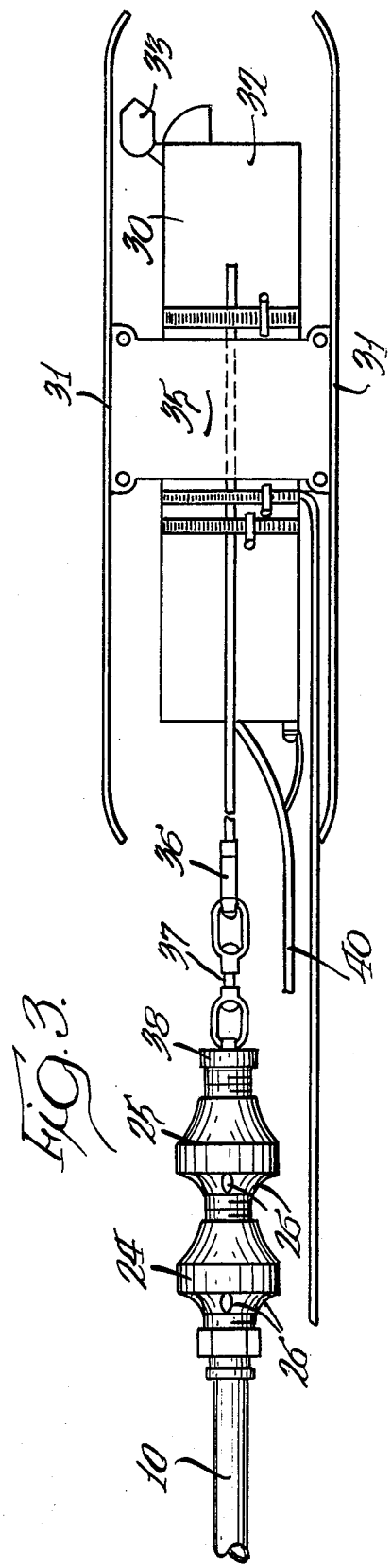

SEWER INSPECTION DEVICE AND METHOD OF SCANNING SEWERS FOR LEAKS

BACKGROUND OF THE INVENTION

This invention pertains to sewer inspection devices along with structure for flushing of sewers and methods of scanning sewers for leaks, whereby a conventional jet nozzle unit that is used for flushing a sewer can also be used to advance a camera along a sewer.

It is well known in the sewer cleaning and flushing art to direct a hydraulic jet nozzle unit into the sewer and deliver water under pressure to it through a hose, with rearwardly-directed jets of water causing advance of the jet nozzle unit and hose along the sewer. Rewinding of the hose causes retraction of the jet nozzle unit with the jets of water flushing material ahead thereof along the sewer as the jet nozzle unit retracts.

It is also known in the art to inspect sewers for leaks which is normally done after cleaning or flushing thereof. Such known systems include either a film camera or, more commonly, a TV camera which is moved along the sewer and which is connected to a receiver aboveground, whereby an observer may watch the receiver to see leaks as they are seen by the TV camera. In such systems, the camera may be moved between adjacent manholes by a cable structure, such as shown in Latall, U.S. Pat. No. 3,739,089, with the TV camera being mounted on a skid, such as shown in Latall, U.S. Pat. No. 3,715,484. It is also known in the art to have a camera unit mounted on a self-propelled carriage, having a motor, which is supplied by an electric line or battery-powered to propel the carriage and the camera along a pipe. The latter type of units are relatively expensive and may involve the use of electric lines which could be hazardous in a water environment. The camera units which are propelled by cable require an initial leading of the cable along the sewer to an adjacent manhole and thus complicate the use thereof.

SUMMARY

A primary feature of the invention disclosed herein is to use the self-propelling jet nozzle unit which is used in flushing of sewers as a means for advancing a camera through a sewer. With such a structure, there are no hazardous electrical lines involved no threading of cable along a sewer and an operator only needs to have the generally available jet nozzle unit to enable sewer inspection by use of a camera by associating the camera with the jet unit.

An object of the invention is to provide a sewer inspection device having a skid-mounted camera for movement along a sewer and combined therewith hydraulic jet propulsion means for advancing the camera along the sewer.

A further object of the invention is to provide a TV sewer flushing and inspection device having a TV camera with skid structure, a jet nozzle unit connected to the camera at the rear thereof and having a series of rearwardly-directed nozzles for directing jets of water rearwardly therefrom, a water pressure hose connected to said unit, a source of water under pressure connected to said hose whereby the jets of water advance the nozzle unit and camera along the sewer as the hose unwinds, and means for rewinding the hose to retract the nozzle unit and camera along the sewer.

Another object of the invention is to provide a method of scanning sewers for leaks using the structure of the preceding paragraph wherein, in a first part of the cycle, the camera and jet nozzle unit are advanced along the sewer by the jets of water with the camera leading and, in a second part of the cycle, the camera and jet nozzle units are retracted along the sewer by rewinding of the hose to cause flushing of the sewer by the water jets and with the camera trailing and scanning the cleaned sewer for leaks.

BRIEF DESCRIPTION OF THE DRAWING

FIG. 1 is a perspective view of a known sewer cleaning device;

FIG. 2 is a vertical section of a sewer system, showing the sewer flushing and inspection device in situ; and FIG. 3 is an enlarged elevational view of a part of the sewer flushing and inspection device shown in FIG. 2.

DESCRIPTION OF THE PREFERRED EMBODIMENT

In the cleaning of sewers, it is common to use water under pressure which, as shown in FIG. 1, is supplied to a hose 10 which is wound on a drum 11, with the drum being carried on a portable unit, such as a truck 12. The truck has a power-driven pump unit 15 for delivering water to the hose 10 under pressure. The truck may carry a source of water in a tank or the truck or a smaller unit may be connected to a source of water, such as a fire hydrant. The drum 11 may freely rotate to permit unwinding of the hose 10 and means (not shown) are provided for powered rotation of the drum for rewinding of the hose.

In FIG. 2, the hose 10 is shown extending downwardly into a manhole 20 which has sewer sections 21 and 22 extending therefrom. The hose 10, at its lower end 23, has a hydraulic jet nozzle propulsion means mounted thereon which, as shown, comprises a pair of jet nozzle units 24 and 25. Each of these jet nozzle units has a series of rearwardly-directed nozzles 26 which deliver rearwardly-directed, high-powered jets of water to propel the jet nozzle units along a sewer. These jet nozzle units are known in the art and are commercially available. With the supply of water through the hose 10 to the jet nozzle units at a substantial pressure, as for example, 2,000 p.s.i., jets of water are directed rearwardly from the nozzle units which, if not confined by the sewer, would extend for a substantial distance but which are confined and do have sufficient power to advance the jet nozzle units along the sewer, or toward the right as viewed in FIG. 2.

One common procedure in cleaning or flushing a sewer is to deliver water under pressure through the hose 10 to the jet nozzle units to cause advance thereof along the sewer a desired distance and the drum 11 is then powered to rewind the hose to draw the jet nozzle units toward the manhole 20 with the jets of water flushing material within the sewer ahead of the jets toward the manhole 20 whereby the material may be removed by other equipment.

It is now well recognized by municipalities and others that sewer leaks are highly undesirable in that ground water may leak into the sewer and substantially increase the demand upon sewer treatment facilities. Because of this, it is desirable to inspect sewers for leaks and, if possible, use known sewer packing systems for sealing said leaks. In such inspection systems, a camera, such as a movie camera or, more commonly, a TV camera, is moved along the sewer to check for leaks and recordings may be made as to the location of the leaks along the sewer for subsequent repair thereof. As shown in the drawings, a TV camera 30 is mounted on a skid structure having skids 31 for movement along the sewer, with a front end 32 having a lens looking toward the right, as viewed in FIGS. 2 and 3, and having a light source 33. Although not intended to limit the invention disclosed herein to the particular structure disclosed, reference may be made to the Latall, U.S. Pat. No. 3,715,484 for a structure of this general type. The skid structure has the skids 31 held together by a frame 35 and the frame 35 is connected to the front end of the jet nozzle unit 25 by a rod 36 and swivel connectors 37, with there being a threaded connection at 38 of a swivel to the leading end of the jet nozzle unit 25. The TV camera has a closed circuit line 40 extending generally along the hose 10 to an aboveground location where it is connected to a receiver, indicated generally at 41.

With the structure disclosed herein, it is possible to advance the camera 30 along the sewer line 22 and the sewer line 22 may be dead-end without causing any problems, since it is not necessary to thread a camera-advancing cable through the sewer. In operation, the unit, as shown in FIG. 2, is lowered into position in the sewer line and the water pressure is then turned on to cause the jets of water to be emitted rearwardly from the jet nozzle units 24 and 25. This causes advance of the camera toward the right, as viewed in FIG. 2 for a desired distance and as permitted by the length of the hose 10, and the scanning for leaks may either be done on the advancing movement of the camera toward the right or during the retracting movement toward the left, as viewed in FIG. 2. It is possible to both clean and inspect the sewer at the same time. This could be done by advancing the unit the desired distance toward the right by the jet action. With the jets still on, the hose 10 is rewound by wind-up of the drum 11, with the jets of water flushing debris ahead thereof towards the manhole 20 and with the camera inspecting the cleaned sewer during the retracting movement.

With the structure and method disclosed herein, it is seen that sewer inspection by a camera may be easily performed with the normally available hydraulic jet cleaning structure without the use of power lines for driving propelling motors or without requiring the threading of cables through a sewer for use in pulling a camera therealong.

I claim:

1. A TV sewer inspection device including an aboveground receiver and a skid-mounted camera for movement along a sewer, and hydraulic jet propulsion means including a jet unit associated with said camera for advancing the camera along the sewer and further comprising a power-operated drum having a pressure hose mounted thereon which is connected to said jet unit for supplying fluid to the jet unit and for retraction thereof by windup of the pressure hose.

2. A method of scanning sewers for leaks comprising, placing a self-advancing jet mozzle and camera unit in the sewer with the camera leading, delivering water under pressure through a hose to said unit to cause rearwardly-directed jets of water to flow from said unit, in a first part of the cycle, advancing the unit along a sewer by said jets with the camera leading and with payout of additional hose and, in a second part of the cycle, retracting said unit by drawing on said hose with the camera trailing and energized to scan the sewer for leaks.

3. A TV sewer flushing and inspection device comprising, a TV camera having skid structure for movement along a sewer, a hydraulic jet nozzle unit connected to said camera at the rear thereof and having a series of rearwardly-directed nozzles for directing jets of water rearwardly therefrom, a water pressure hose connected to said unit, a source of water under pressure connected to said hose whereby the jets of water advance the nozzle unit and camera along the sewer as the hose unwinds, and means for rewinding the hose to retract the nozzle unit and camera along the sewer.

* * * * *